US009367544B2

(12) United States Patent
Stojancic et al.

(10) Patent No.: US 9,367,544 B2
(45) Date of Patent: Jun. 14, 2016

(54) METHOD FOR EFFICIENT DATABASE FORMATION AND SEARCH ON MEDIA DEVICES ACTING SYNCHRONOUSLY WITH TELEVISION PROGRAMMING

(71) Applicants: Mihailo M. Stojancic, San Jose, CA (US); Sunil Suresh Kulkarni, Santa Cruz, CA (US); Shashank Merchant, Sunnyvale, CA (US); Jose Pio Pereira, Cupertino, CA (US); Oleksiy Bolgarov, San Jose, CA (US)

(72) Inventors: Mihailo M. Stojancic, San Jose, CA (US); Sunil Suresh Kulkarni, Santa Cruz, CA (US); Shashank Merchant, Sunnyvale, CA (US); Jose Pio Pereira, Cupertino, CA (US); Oleksiy Bolgarov, San Jose, CA (US)

(73) Assignee: Gracenote, Inc., Emeryville, CA (US)

( * ) Notice: Subject to any disclaimer, the term of this patent is extended or adjusted under 35 U.S.C. 154(b) by 210 days.

(21) Appl. No.: 13/826,502

(22) Filed: Mar. 14, 2013

(65) Prior Publication Data
US 2013/0246457 A1 Sep. 19, 2013

Related U.S. Application Data

(60) Provisional application No. 61/610,672, filed on Mar. 14, 2012.

(51) Int. Cl.
*G06F 17/30* (2006.01)
(52) U.S. Cl.
CPC .... *G06F 17/30023* (2013.01); *G06F 17/30026* (2013.01); *G06F 17/30047* (2013.01)

(58) Field of Classification Search
CPC .................. G06F 17/30023; G06F 17/30026; G06F 17/30047
See application file for complete search history.

(56) References Cited

U.S. PATENT DOCUMENTS 6,654,766 B1 * 11/2003 Degenaro et al.
2011/0276333 A1 * 11/2011 Wang ................ G06F 17/30861
704/270

* cited by examiner

*Primary Examiner* — Usmaan Saeed
*Assistant Examiner* — Paul Kim
(74) *Attorney, Agent, or Firm* — Hultquist, PLLC; Peter H. Priest

(57) ABSTRACT

Techniques for efficient database formation and search in applications embedded in a media device are provided. The search may be performed synchronously with presentation of media programming content on a nearby media presentation device. A mobile media device captures some temporal fragments of the presented audio/video content on its microphone and camera, and then generates query fingerprints for the captured fragment. A local reference database resides on the mobile media device and a master reference database resides on a remote server with a most recent chunk of reference fingerprints transferred dynamically to the local mobile media device. A chunk of the query fingerprints generated locally on the mobile media device are searched on the local reference database for continuous content search and identification. The method presented automatically switches between the local search on the mobile media device and a remote search on an external search server.

14 Claims, 8 Drawing Sheets

METHOD FOR EFFICIENT DATABASE FORMATION AND SEARCH ON MEDIA DEVICES ACTING SYNCHRONOUSLY WITH TELEVISION PROGRAMMING

This application claims the benefit of U.S. Provisional Patent Application Ser. No. 61/610,672 entitled "A Method for Efficient Data Base Formation and Search on Portable Media Devices Acting Synchronously with Television Programming" filed on Mar. 14, 2012 which is hereby incorporated by reference in its entirety.

CROSS REFERENCE TO RELATED APPLICATIONS

U.S. application Ser. No. 12/141,337 filed on Jun. 18, 2009 entitled "Method and Apparatus for Multi-dimensional Content Search and Video Identification", U.S. application Ser. No. 12/141,163 filed on Jun. 18, 2008 entitled "Methods and Apparatus for Providing a Scalable Identification of Digital Video Sequences" now issued as U.S. Pat. No. 8,229,227, U.S. application Ser. No. 12/141,337 filed on Jun. 18, 2008 entitled "Method and Apparatus for Multi-Dimensional Content Search and Video Identification" now issued as U.S. Pat. No. 8,171,030, U.S. application Ser. No. 12/788,796 filed on May 24, 2010 entitled "Multi-Media Content Identification Using Multi-Level Content Signature Correlation and Fast Similarity Search", U.S. application Ser. No. 12/772,566 filed on May 3, 2010 entitled "Media Fingerprinting and Identification System" now issued as U.S. Pat. No. 8,195,689, U.S. application Ser. No. 12/612,729 filed on Nov. 5, 2009 entitled "Digital Video Content Fingerprinting Based on Scale Invariant Interest Region Detection with an Array of Anisotropic Filters" now issued as U.S. Pat. No. 8,189,945, U.S. Pat. No. 8,229,227 filed on Jun. 18, 2008 entitled "Methods and Apparatus for Providing a Scalable Identification of Digital Video Sequences", U.S. patent application Ser. No. 13/094,158 filed on Apr. 26, 2011 entitled "Actionable Event Detection for Enhanced Television Delivery and Ad Monitoring Based on Video/Audio Content Fingerprinting", U.S. Provisional Patent Application Ser. No. 61/610,672 filed on Mar. 14, 2012 entitled "A Method for Efficient Data Base Formation and Search on Portable Media Devices Acting Synchronously with Television Programming", and U.S. patent application Ser. No. 13/509,701 filed on Aug. 21, 2012 entitled "Media Content Identification On Mobile Devices" and having the same assignee as the present application are related applications and hereby incorporated by reference in their entirety.

FIELD OF THE INVENTION

The present invention relates generally to aspects of efficient identification of audio or video media, such as television programming, by using a media device equipped with audio/video signal capturing and fingerprinting mechanisms. More particularly, it relates to aspects of robust audio/video signal fingerprinting in the presence of ambient noise, efficient database formation distributed between a remote server and the media device, and database query with automatic switching between remote search on an external search server and local search on a local reference database on the media device.

BACKGROUND OF THE INVENTION

With the ubiquity of mobile devices, especially smart mobile phones, a large proportion of the population often simultaneously watch programming content on their television while using their portable mobile device for text messaging or Internet related activities. Recent development of audio/video content fingerprinting technologies and capable mobile/media devices as smart phones and tablets, have opened up many new possibilities in developing sophisticated applications synchronous to detected television programming events. However, techniques for identifying captured segments of media presented on a device such as a television have proven to be very difficult to achieve.

SUMMARY OF THE INVENTION

Among its several aspects, the present invention recognizes it is possible to have efficient video synchronous applications on a media device by providing the media device with capability to promptly identify and track content being played on a television set in the presence of ambient noise.

In one or more of its several aspects, the invention addresses problems of efficient media device local data base structuring, and query result based switching between query search on the local reference data base and the query search on the remote server reference data base. An embodiment of the invention addresses a method for efficiently querying a database on a media device. A reference cache database is formed on the media device partitioned for multiple levels of query search, wherein each search level represents a larger portion of the reference cache database than a previous search level. Each search level is queried in progressively larger portions of the reference cache database on the media device with automatic switching between a local search on the media device and a remote search on an external search database upon not finding a match in any search level portion of the reference cache database. Upon finding a match in the remote search, a chunk of reference media content fingerprints is downloaded from a neighborhood of matching reference fingerprints on the external search database to be stored in the reference cache database on the media device, whereby the reference cache database is updated with current search area reference material.

Another embodiment addresses a method for simultaneous capture and querying on a mobile media device. A first fragment of media content is captured from a media presentation device during background operations on a mobile media device, wherein the captured first fragment of media content is saved to a circular buffer. The first fragment of captured media content retrieved from the circular buffer is fingerprinted to generate signatures representing the first fragment of captured media content. A local reference database on the mobile media device is queried with the generated signatures while a second fragment of media content is being captured from the media presentation device.

Another embodiment addresses a method for manual and automatic local signature cache management. A signature cache is formed on a mobile media device to hold one set of signatures that is automatically managed for switching between a local search and a remote search, wherein downloading of reference media signatures and signature cache management are performed automatically based on search responses from the local search and from the remote search. A manually managed signature cache is formed with functions provided that allow for explicit downloading of the reference media signatures to the signature cache.

A further embodiment addresses a computer readable non-transitory medium encoded with computer readable program data and code. A reference cache database is formed on the media device partitioned for multiple levels of query search, wherein each search level represents a larger portion of the reference cache database than a previous search level. Each search level is queried in progressively larger portions of the reference cache database on the media device with automatic program controlled switching between a local search on the media device and a remote search on an external search database upon not finding a match in any search level portion of the reference cache database. Upon finding a match in the remote search, a chunk of reference media content fingerprints is downloaded from a neighborhood of matching reference fingerprints on the external search database to be stored in the reference cache database on the media device, whereby the reference cache database is updated with current search area reference material.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium. Any suitable non-transitory computer readable medium may be utilized including hard disks, CD-ROMs, optical storage devices, flash memories, or magnetic storage devices.

Computer program code or software programs that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1:
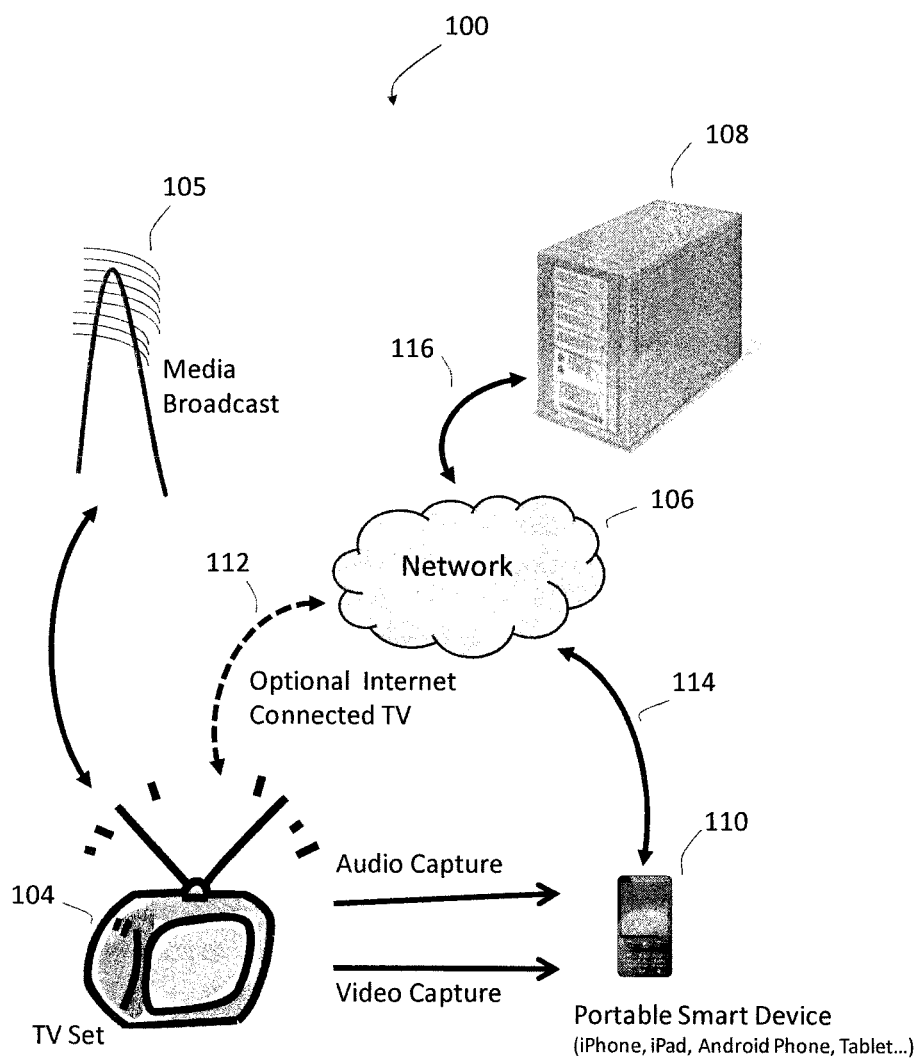
FIG. 1 illustrates a system for providing audio and video synchronous two-screen applications on a media device.

One aspect of the invention presents a method to identify media content which includes audio, video, or both audio and video content, by capturing the audio and/or video data from the mobile device, appropriately processing the audio and/or video content, fingerprinting the audio and/or video data, and searching fingerprint databases to identify the audio or the video content. Captured fragments of audio, video, or audio and video signals are hereinafter referred to as media content. FIG. 1 illustrates a system 100 for providing audio and video synchronous two screen applications on a media device. The system 100 includes a media presentation device 104, such as a television set, a desktop, laptop, or tablet computer, a digital video disc (DVD) player, or a smartphone device configured to display media programming, such as television programs, movies, Internet videos, or the like, or play audio media such as wireless received radio signals, compact discs (CDs), or the like. The media presentation device, such as a television set, may be connected to a remote media broadcast system 105 for receiving television programming content. Also, the media presentation device 104 may or may not be connected to the Internet 106. The system 100 also includes a remote content identification system 108 and a mobile media device 110 connected over the Internet 106 to the remote content identification system 108. The mobile media device 110 includes a smartphone device, a laptop, a tablet computer, or the like. Set top boxes and gaming machines may also act as a media device that is placed intermediate between an external search server and the mobile media device 110, having a remote database that is a subset of an external search server database but of greater capacity than a local reference database on the mobile media device 110. Connections 112, 114, and 116 may be wired or cabled connections, wireless connections, or a combination of wire cable and wireless connections. For example, the mobile media device 110 may connect wirelessly to the Internet 106 through a wireless router or over 3G or 4G networks while the remote content identification system 108 may be wire or cable attached through a modem to the Internet 106. The mobile media device 110 may be configured to acquire audio signals from the media presentation device 104 by use of a microphone. The mobile media device 110 may also be configured to acquire images or a video from the media presentation device 104 by use of an image sensor or camera, such as a charge coupled device (CCD) image sensor and a camera lens assembly included in the mobile media device 110.

Illustrated system 100 supports applications on the mobile media device 110 that operate in real time and in accordance with television or other media programming content that is being presented on a media presentation device 104 and received by the mobile media device 110. The mobile media device 110 is configured to acquire a temporal fragment of media content, including audio content, video content, or both, that are playing on the media presentation device 104, using the mobile device's microphone, camera, or both, and generates query fingerprints from the temporal fragment of the acquired media content.

A chunk of the query fingerprints is a set of the query fingerprints corresponding to a time segment of the query media signal. Also, a digest of the chunk of the query fingerprints may be formulated as a search query to a local search database on the mobile media device 110 or transmitted to the remote content identification system 108, also referred to as an external search database or a remote search server 108, for content identification. A digest of the query fingerprints is a summarization of the fingerprints generated for the acquired media content. If the search query is found in a reference database either local or remote, the search process responds with responsive data, such as a title and timing information of the identified media content, along with related metadata, and sends the title, the timing information, and the related metadata to the application that initiated the query on the mobile media device 110. The original chunk of query reference fingerprints or the digest of the query fingerprints found on the remote search server 108 is stored on the mobile media device 110 for further use in local querying a mobile media device database located on the mobile media device 110 and tracking of media content. The method presented automatically switches between remote search on an external search server, and local search on a local reference database on the mobile media device. The local reference database is also described as a signature cache.

The mobile media device 110 may be configured to continuously listen, observe, or listen and observe the media programming content. The programming content may also be tracked by querying locally stored mobile media device reference content. If a change in the media programming content is detected, the mobile media device 110 generates one or more new queries that are searched for content identification. This process continues as long as the mobile media device 110 is listening to, and or observing video, or both with respect to the media programming content.

The mobile media device 110 may be equipped with an actionable program event detection system, which generates an action signal upon detection of a particular audio, video, or audio and video fragment stored in the reference fingerprint database. A software application running on the mobile media device 110 can then perform actions based on local search results, presenting to the user a variety of additional information on the same mobile media device 110 in real time while the remote media programming is still playing the associated media content.

The method presented automatically switches between a remote search on the external search database 108, and a local search on a "micro search server" on the mobile media device 110.

Figure 2:
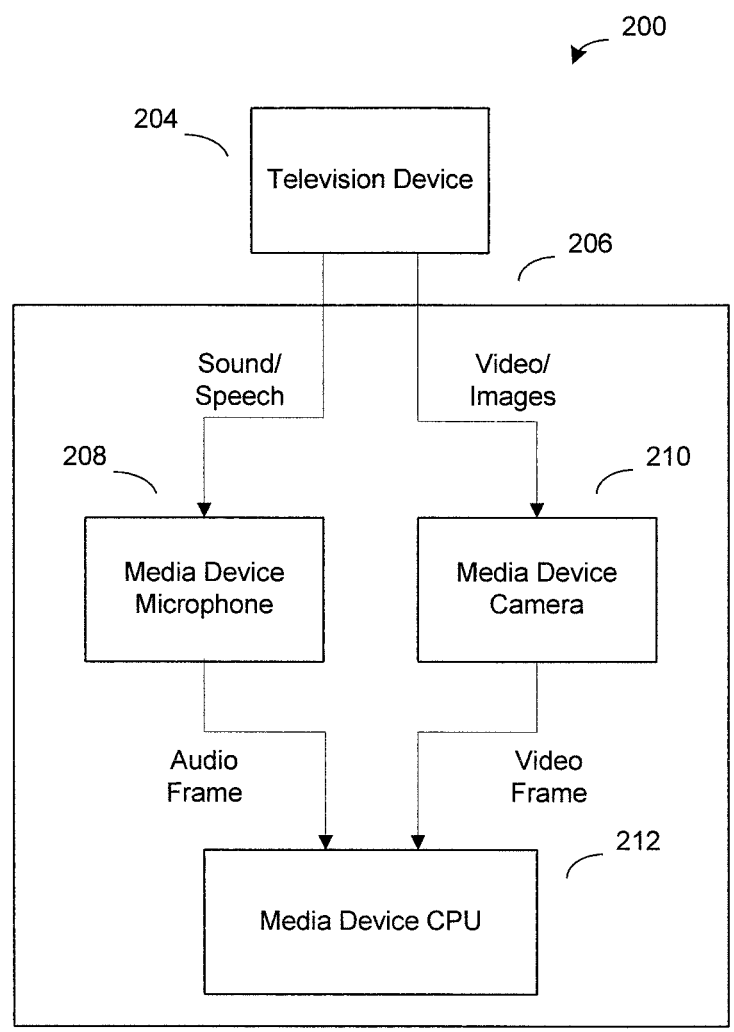
FIG. 2 illustrates a process for television content audio/video capture on a media device.

FIG. 2 illustrates a process 200 for media content capture on a mobile media device. By using such a content identification system, it is possible to configure a real-time media content analysis software application, to run on the mobile media device itself. In particular, FIG. 2 illustrates the process 200 configured to acquire played television media content from a television device 204 on a media device 206. The television device 204 is configured to play a television program that generates sounds and speech from speakers in synchronism with images and video from a display device, such as a liquid crystal display (LCD) or light emitting diode (LED) display. The media device 206 is configured with a microphone 208 to acquire the sounds and speech and transform the sounds and speech to audio signals. The media device 206 is also configured with a camera device 210 that acquires the images and video, and transforms the images and video to a sequence of pixels or frames of pixels. The media device 206 is configured with a central processing unit (CPU) system 212 that acquires the audio and pixel data for analysis.

Figure 3:
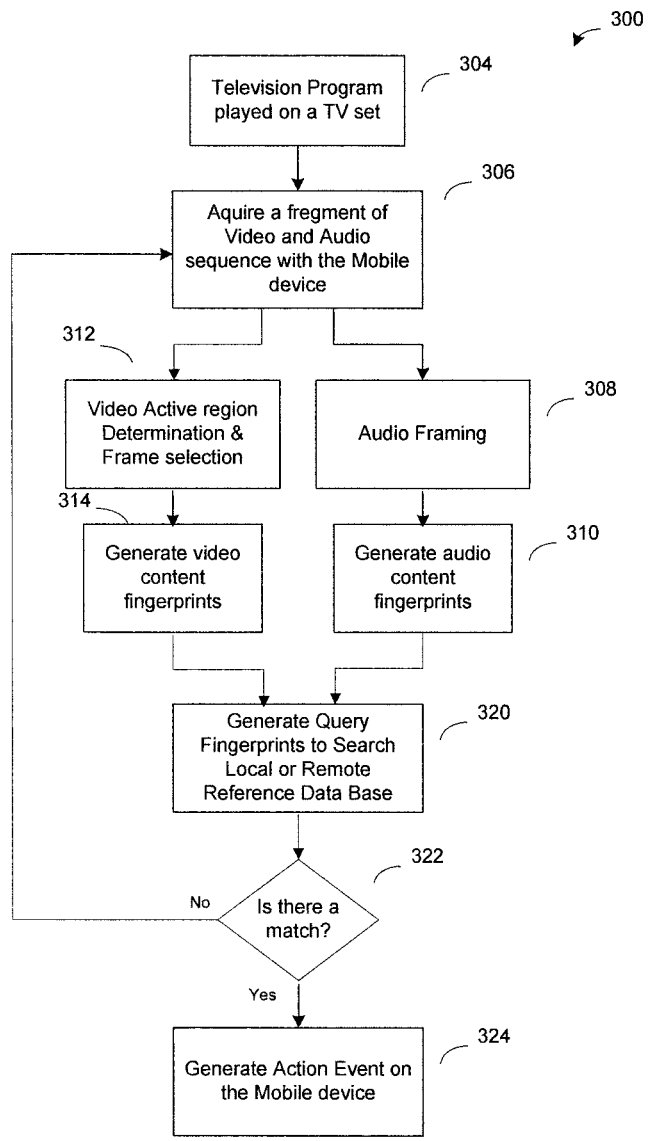
FIG. 3 illustrates a process to identify video and audio content captured by a mobile media device from a nearby television (TV) screen and to trigger a mobile application action on the mobile media device.

FIG. 3 illustrates a process 300 for identification of audio or video content captured by a mobile device from a nearby television (TV) set and triggering a mobile application action. At step 304, a television program is selected to be played on the television set. At step 306, a fragment of audio and video signals are acquired on the mobile device, such as described in U.S. Pat. No. 8,189,945 and U.S. patent application Ser. No. 13/509,701 which are incorporated by reference in their entirety. Audio and video signatures used for query formation are usually captured in 5-10 second chunks, either automatically in preset intervals, for example every 3 seconds, if a continuous mode of capturing is selected, or at a user's discretion, if the mobile media device operates in an asynchronous media content capturing mode. For example, a user knowing a certain program is to be recorded or watched, explicitly selects a package of information, such as from a menu of selections or from a remote web site, concerning the certain program to be downloaded to the user's personal media device, such as a smartphone or a tablet. The package of information contains fingerprints pertinent to the certain program and metadata containing the selected information with the pertinent fingerprints stored to a signature cache on the user's personal media device.

The captured 5-10 seconds of audio and video contents are passed to the associated step in the mobile application for processing the audio and video signals as an audio waveform and video frames, respectively, and to form multi-signature queries for television content identification. At step 308, the audio waveform is framed. At step 310, the framed audio waveform is fingerprinted with an audio fingerprinting system, such as described in U.S. patent application Ser. No. 13/509,701. At step 312, one or more active regions are determined in the video frames and a set of frames are selected for further processing. At step 314, active television regions in the selected video frames are fingerprinted with a video fingerprinting system, such as described in U.S. Pat. No. 8,189,945. This fingerprinting may occur entirely locally on the mobile device, entirely remotely on a remote server, or partially locally and remotely. If performed entirely remotely, the audio waveform and the video frames are transmitted to the remote server. Alternatively, some partial fingerprint processing may be done locally and then the remainder of the fingerprint processing may be done remotely. In this alternative embodiment, video frame selection from a sequence of video frames is performed locally on the mobile device and then only the selected video frames are transmitted to the remote server for fingerprint processing. For audio, the audio waveform may be resampled to a lower sampling rate and down mixed to one channel, before generating the fingerprints. Compression of the video frame and the audio samples may be used to reduce transmission costs.

At step 320, the audio fingerprints and video fingerprints are combined and a selected set of fingerprints are used as query fingerprints. Having both audio fingerprints and video fingerprints representing the television programming content increases the reliability of television content identification under severe audio and video signal degradations due to the surrounding ambient conditions. The resulting audio and video query fingerprints are transmitted to a search server. A search function may be either local, residing on the mobile media device or remote, accessed for example through the Internet cloud. At step 320, the search server responds with a message that details where the audio and video content were found in the search database, and if found, the title of the content, the matching times, and related metadata, like an image representing the program, details about actors, or the like. If a match is not found at step 322, the process 300 returns to step 306 to select another fragment of media content for processing. If a match is found at step 322, the process 300 proceeds to step 324.

At step 324, the mobile application receives the snatch data and may be configured to trigger actions that are based on this data, such as described in U.S. patent application Ser. No. 13/094,158. Such actions may include displaying the identity of the content to the user, retrieving related information based on the identity of the content, allowing the user to register or "check-in" to that piece of content with a registration server online, display an interactive ad based on the content and perhaps knowledge about the user, or may enable a variety of other real time applications based on detected audio and video content.

Figure 4:
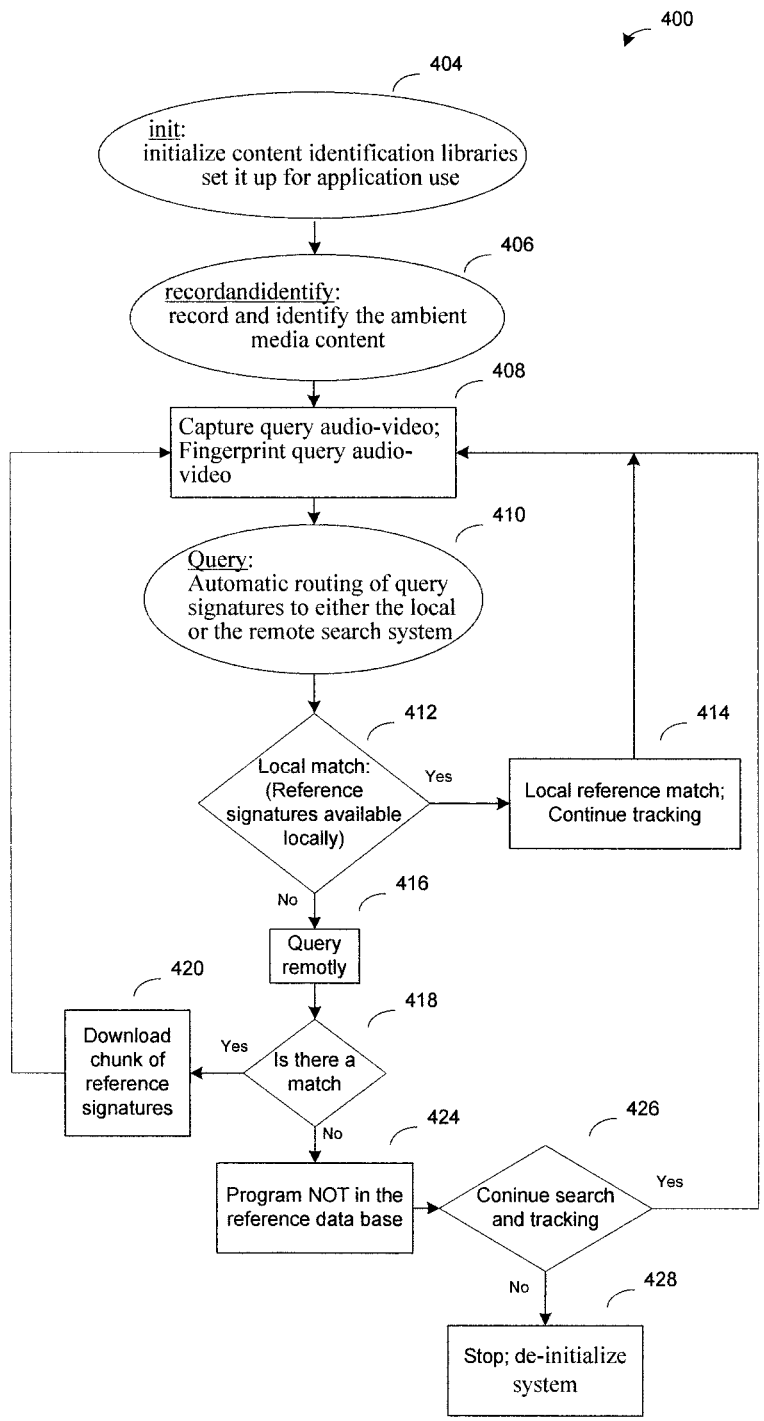
FIG. 4 illustrates a process to automatically switch between a search operation on a remote search server and a local search operation on a mobile media device.

FIG. 4 illustrates a process 400 to automatically switch between a search operation on a remote search server and a local search operation on a mobile media device to provide an integrated local-remote search. The client mobile/media device software library is accessed through a set of application programming interfaces (APIs). For example, at step 404, a search media application initializes the mobile media device 110, a mobile media content identification library located on the mobile media device 110, and a remote content identification library to use the search media application. For example, an initialize database application programming interface (API) is utilized to initialize a local micro search server and a remote database search server. At step 406, a record and identify application is called and the search media application determines to identify ambient media content being watched on a display device, such as a television, in response to an input such as provided by a user of the mobile media device. The input may also be provided by a signal supplied by an external source. The media content, or at least a fragment of the media content, may also be recorded on the mobile media device for identification purposes. The record and identify application is used to provide this function which communicates with the local micro search server, or the remote search server, or both during the search process.

At step 408, the media is captured and a media query is generated for the captured media, which includes audio fingerprints, video fingerprints, or audio and video fingerprints. At step 410, the media query is routed initially to the local micro search server and if the media query is not located in the local database, the media query is transmitted to a remote search server if authorized to do so. At step 412, a determination is made whether the local match was successful. If the local match was successful, the process 400 proceeds to step 414. At step 414, a tracking application is initialized and executed to track the matched media content.

Returning to step 412, if the local match was not successful, the process 400 proceeds to step 416. At step 416, the media query is transmitted to the remote search server. At step 418, a determination is made whether the remote search server found a match. If a match was found, the process 400 proceeds to step 420. At step 420, a chunk of reference signatures for the matched media content is downloaded to the mobile media device. The process 400 then returns to step 408 to process another media query.

Returning to step 418, if a match was not found, the process 400 proceeds to step 424. At step 424, the media content associated with the media query is marked as not found in current remote search database. At step 426, a decision to continue search and tracking is requested. If the decision is to continue search and tracking, the process 400 proceeds to step 408. If the decision is to not continue search and tracking, the process 400 proceeds to step 428. At step 428, the search media application calls for de-initialization when it no longer needs to use the library.

The record and identify application at step 406 performs the identification of the content by activating step 408. There are three main sub-functions inside this function including, media capture, such as audio fragments, for example, 5-10 seconds of the television programming audio, media fingerprinting, such as audio fingerprinting forming multi-signature 5-10 second queries, and query reference database search. In a similar manner, the record and identify application may capture video segments, and generate video fingerprints, and control video search operations. For example, captured audio samples are fed to a fingerprinting system, which computes a set of signatures. These signatures are used in the query to the search system. The query function implements automatic routing of the signatures to either the local or the remote search system.

Figure 5:
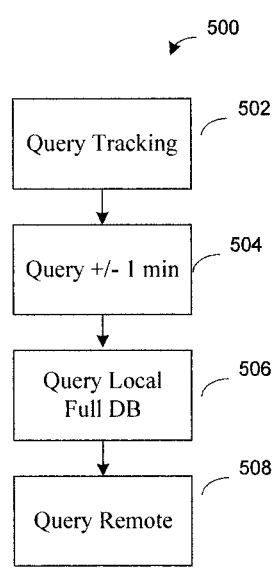
FIG. 5 illustrates a plurality of search levels available to a mobile media device.

FIG. 5 illustrates a plurality of search levels 500 available to a mobile media device. Four exemplary levels of search 502, 504, 506, and 508 through which a query can progress are shown in FIG. 5. Each level represents a progressively larger portion of the reference fingerprint database. A query tracking level 502 has a reference search range that is limited to a media portion adjacent to a previous successful search match and just slightly larger in time span than a query length. If a previous successful search is not available, the search process proceeds to the next search level and if necessary continuing up to executing the search on a remote server. With a successful remote search, a corresponding chunk of signatures for the matched data is downloaded to the mobile media device for future reference. This level 502 is the fastest possible search option. A query+/−1 minute level 504 has a reference search range that is limited to the time span around the previous successful search match, plus or minus N seconds, with the default being N=60 seconds and user modifiable. A query local full database level 506 has a reference search range that is the entire locally accessible set of reference signatures that have been downloaded to the mobile media device, which operates as a client to the remote search server. A query remote level 508 has a reference search range of the full capacity of a master reference database located on the remote search server. At this level 508, the media query is redirected to the remote server. This level 508 is the slowest search option due primarily to network delays.

Figure 6:
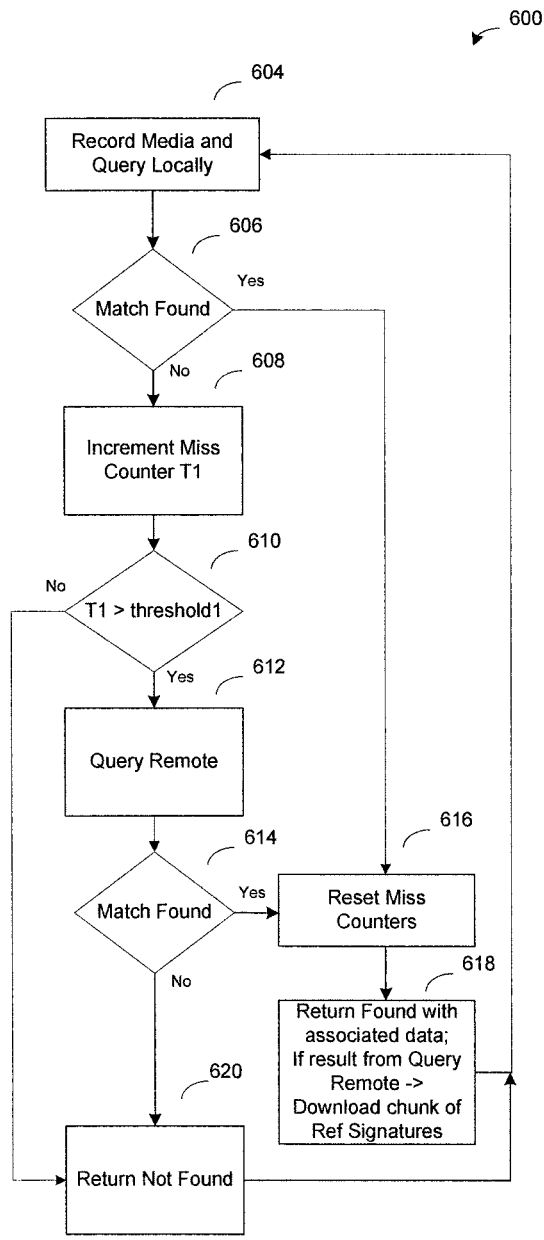
FIG. 6 illustrates a process for a mobile media device initiated local or remote query search utilizing a miss counter.

FIG. 6 illustrates a process 600 for a mobile media device initiated local or remote query search utilizing a miss counter. FIG. 6 shows a more detailed process for the remote-local query search operation. At step 604, a recorded query is first sent to the local search. At step 606, a determination is made whether a match is found locally. If a match is not found in the local search, then the process 600 proceeds to step 608. At step 608, an internal counter having a count T1 of the search misses is incremented. At step 610, a determination is made whether the count value of this counter is greater than a first threshold, threshold). If the count value T1 is greater than the threshold), the process 600 proceeds to step 612. At step 612, the query is sent for a remote search. At step 614, a determination is made whether a match is found from the remote search. If a match is found from the remote search, the process 600 proceeds to step 616. Also, returning to step 606, if a match is found in the local search, then the process 600 proceeds to step 616. At step 616, the search miss counter is reset. At step 618, the found result including an indication FOUND together with associated data are returned, and a chunk of reference signatures corresponding to a range around the match point, according to a time stamp from the query, are downloaded to the mobile media device, replacing the existing local reference database with the new chunk of signatures, and the process 600 returns to step 604. Returning to step 614, if a match is not found from the remote search, the process 600 proceeds to step 620. At step 620, the originally submitted query is marked NOT FOUND, which may be displayed or modified before displaying to a user of the mobile media device. The process 600 then proceeds to step 604 to repeat a local search with a newly recorded query.

Figure 7A:
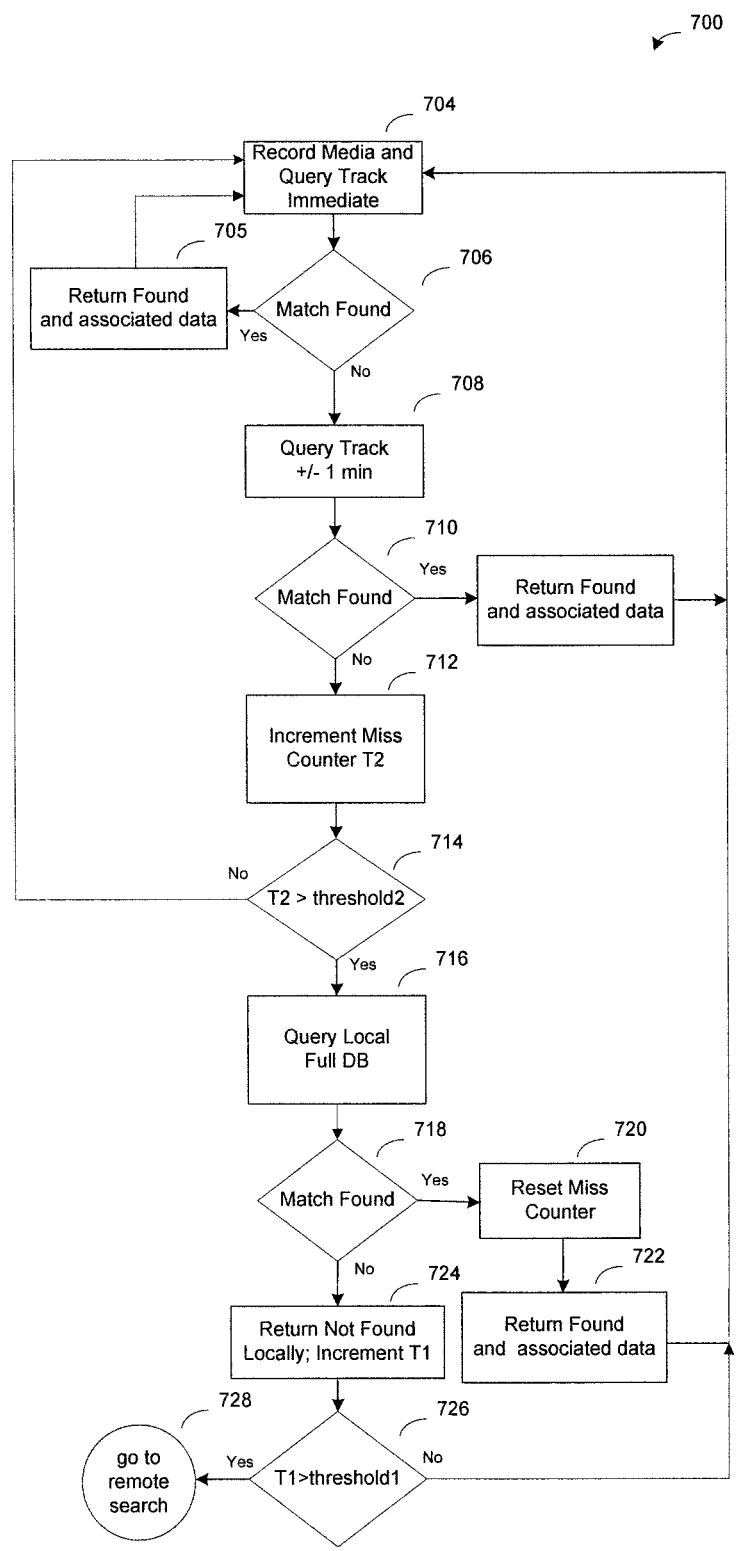
FIG. 7A illustrates a process for a mobile media device initiated local query search utilizing a miss counter.

FIG. 7A illustrates a process 700 for a mobile media device initiated local query search utilizing a miss counter. At step 704, the media is recorded, and initial query is searched in a first subset of the full local database, such as the query tracking level 502. At step 706, a determination is made whether a match to the query has been found. If a match is found, the process 700 proceeds to step 705. At step 705 the match search results are obtained from the subset of the full local database, such as from the query tracking level 502. The process 700 then returns to step 704. If a match is not found, the process 700 proceeds to step 708. At step 708, the query is searched in an extended subset of the full local database, such as the query+/−1 minute level 504. The extended subset has larger capacity than the first subset and as a consequence takes longer to search than the first subset. The local search at steps 704 and 708 are fast as compared to a full local database search or a reference database search at the remote search server. At step 710, a determination is made whether a match to the query has been found. If a match is not found, the process 700 proceeds to step 712. At step 712, an internal counter having a count T2 of the search misses is incremented. At step 714, a determination is made whether the count value T2 of this counter is greater than a second threshold, threshold2. If the count value T2 is not greater than the threshold2, then the process 700 goes to step 704 to capture new query and proceed with local search. If the count value T2 is greater than threshold2, then process 700 sends the query to a full local database search stage as level 506. At step 716, a search of the full local database is initiated. At step 718, a determination is made whether a match has been found in the full local database. If a match is found in step 718, the process 700 proceeds to step 720. At step 720, the search miss counter is reset. At step 722, the match search results are obtained from the full local database on the mobile media device. The process 700 then returns to step 704.

Returning to step 718, if the full local database match is not found, the process 700 proceeds to step 724. At step 724, the miss counter having a count T1 is incremented. At step 726, if the count value T1 of the miss counter is greater than the threshold) the process 700 proceeds to do a search on a remote search server at step 728. If at step 726 the count value T1 of the miss counter is less than the threshold), the process 700 goes back to step 704.

A signature cache is a part of the mobile media device local operating memory dynamically allocated by the application at run time. The signature cache can hold at least one chunk of reference signature data corresponding to a length of time of reference media content, for example a number of reference signatures corresponding to 3 minutes of reference media content. The query schemes for "immediate" search, the "+/−1" minute search and the "full" local search represent the ways and what segments of the signature cache are searched. As an example, three minutes worth of reference signature data can be downloaded from the remote server by the client mobile media device, allowing for local reference database search as outlined in the previous sections. When a new set of signatures is downloaded, the contents of the signature cache are overwritten. The size of the local memory signature cache is programmable. A full local search refers to searching through the entire local memory cache reference content to try to find a match. The full local search is generally the last attempt to find a match to the query in local memory. After the full local search, if the query not found, a search of the remote reference database is initiated and if a match is found at the remote database, a new chunk of reference material for the match is downloaded overwriting the old chunk in the local memory.

Querying with audio content that is not in either the local or remote reference database will result in NOT FOUND at both the local and remote stages. Once the miss threshold) has been reached and before a match is found, queries will be sent to the remote server. This increases the load on the remote server without getting any of the caching benefits of the local search.

Figure 7B:
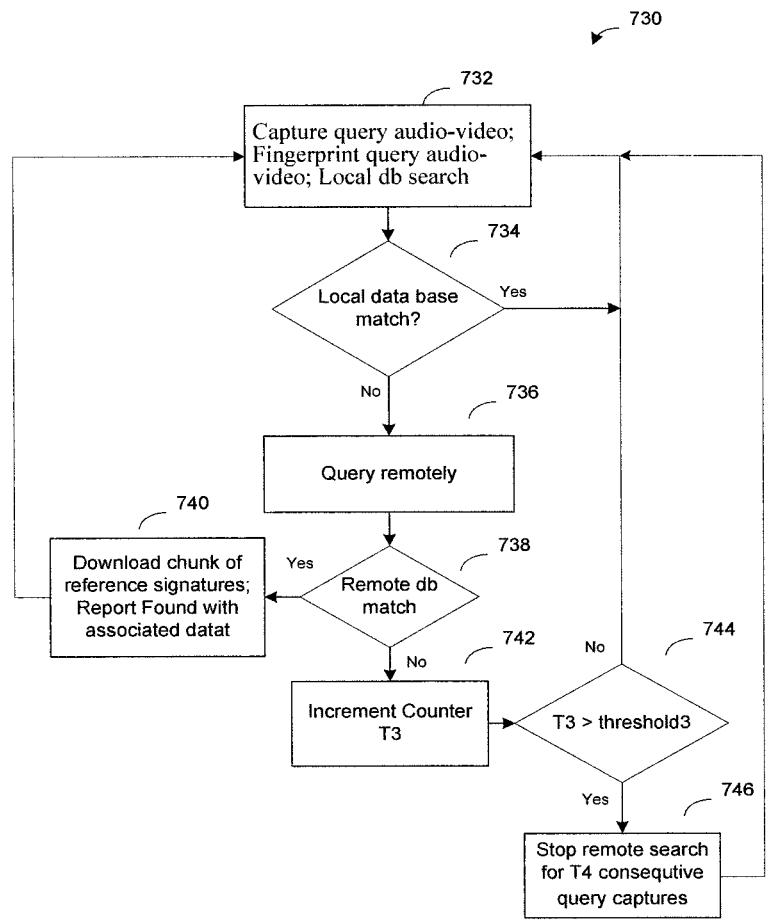
FIG. 7B illustrates a process for controlling and limiting access to a remote server to prevent increase in the network bandwidth for the case of a query for nonexistent reference data in a remote reference database.

FIG. 7B illustrates a process 730 for controlling and limiting access to a remote server to prevent an increase in the network bandwidth for the case of a query for nonexistent reference data in a remote reference database. To resolve this case, another counter having a count value T3 is introduced in FIG. 7B that keeps track of a count of how many consecutive NOT FOUND searches occurred to the remote server. FIG. 7B illustrates the utilization of this T3 counter in the overall process of local-remote switching mechanism. At step 732, media content is captured, fingerprinted, and local search is performed. If there is a match at step 734, the next media query is initiated at step 732. If there is no a match, a remote search is performed at step 736. If there is a match in the remote reference database at step 738, a new chunk of reference fingerprints is downloaded at step 740, and the process goes back to step 732. If there is no a match in the remote reference database at step 738, the T3 counter is incremented at step 742. If a number of consecutive remote search requests are executed with NOT FOUND results, bringing the T3 counter above a third threshold, threshold3, as determined at step 744, the next T4 queries to the remote server are suppressed at step 746. The process 730 pauses at step 746 waiting for the T4 requests to elapse. There is no need to stop capturing and querying the local reference database since this does not have a large affect on performance or power drain on the mobile media device. However, going to the remote server involves transmitting queries and in this case many queries when it is likely that the captured content is not in the remote reference database. For example, while capturing and querying a program, a long series of commercials begin to play and in this example, these commercials are not in the remote reference database. The transmitting of many queries would have an effect on the network bandwidth utilization and performance of the remote server. Consequently, T4 queries are stopped providing time for the commercials to end and the program to resume, for example. After these T4 queries, the process 730 resets the T3 counter, and returns to step 732 and another query is searched locally and if not found sent to the remote server. If a query is found at any stage, then the appropriate counters are reset, a new chunk of reference fingerprints is downloaded at step 740, and the process continues with step 732.

The record and identify application of step 406 in FIG. 4 performs capture media and query to the local and remote server. To allow for independent start of media content capture and independent start of fingerprinting and querying, the following functions are introduced:
1. startAudioCapture: This function starts the capture of audio in the background. Audio samples are saved to a circular buffer.
2. stopAudioCapture: This function stops the capture of audio.
3. queryWithDuration: This function queries to the local and remote search servers with a specified duration. For example, if the duration is seven seconds, the audio samples in the buffer corresponding to the previous seven seconds of content are fingerprinted and queried. It is required to have started audio capture before calling this function.

StartVideoCapture and stopVideoCapture functions are similarly used for video media query support. Independent start of media capture and independent start of fingerprinting and querying allows the mobile media device to continuously capture media content in the background, while simultaneously performing fingerprinting and querying on the specified length of the media content residing in the circular buffer.

For automatic switching between the local and remote search server, the signature cache holds one set of signatures that is automatically managed. That is, downloading and cache management are performed automatically based on results of each search. FIGS. 6 and 7 address the flow of local and remote search processes using an automatic reference signature download based on the outcome of a query search.

The signature cache can be also managed manually. A number of signature slots may be specified when instantiating the system. Each signature slot may hold multiple signatures. Manually managing the signature cache is an advanced feature used in some application cases when a particular expected captured media content is desired to trigger events within the mobile media device. Additional functions are provided that allow for user initiated or manual downloading of signatures from the remote server to particular cache slots, flushing the contents of the slot, and returning a list of the manually downloaded reference signatures. Examples of these additional functions are given below:
1. initWithServerAndNumSlots: This function initializes the content identification library, and sets it up for the application use. The number of signature cache slots is specified. This is an alternative to the initialization function with predetermined parameters as described earlier in FIG. 4.
2. downloadSigsToCache: This function downloads signatures associated with a particular program and specified by the signature identification number (asset id) associated with each signature to the specified signature cache slots. The contents, if any, of the specified signature cache slot are overwritten.
3. flushSigsFromCache: This function removes signatures from the specified signature cache slots.
4. getListOfCacheContents: This function returns a list of the asset id, cache slot position, starting signature timestamp, ending signature timestamp, and number of signatures for each non-empty signature cache slot.

As described in the previous paragraphs, for the signature cache that is automatically managed, if a match is found from the remote server, signatures are downloaded for a next specified chunk of time. As long as the same content is being queried, and the local cache contains the downloaded reference signatures, the local search will match with the signatures in this automatically managed cache, keeping track of the time line of matched reference signatures. However, after reaching the end of the time line in this signature cache, or the last matching signature in the current local cache, the local search will return NOT FOUND, and the query will eventually hit the remote server and again the signatures will be downloaded for the next specified chunk of time.

However, before the end of the signature cache is reached, for instance K seconds before the end, the next chunk of signatures may be pre-fetched or downloaded in advance prior to reaching the end of the signature cache. Each signature is associated with a time stamp and the succession of signatures in a time line is known. Thus, before the last signature in the signature cache is reached, which would be the end of a time line for the locally stored chunk of signatures, a new chunk of signatures associated with the asset id and remaining time for the asset id is requested in advance of reaching the last signature. Thus, local search querying can continue uninterrupted.

The size of the chunk of signatures to download may advantageously be programmable, and specified by the function setSigDownloadChunkSize. This function specifies, in seconds for example, the size of the chunk of signature data to be downloaded at one time.

During reference signature download from the remote server, the local search database is locked only when copying downloaded signature contents into the database.

It is understood that other embodiments of the present invention will become readily apparent to those skilled in the art from the above detailed description, wherein various embodiments of the invention are shown and described by way of the illustrations. As will be realized, the invention is capable of other and different embodiments and its several details are capable of modification in various other respects, all without departing from the present invention. Accordingly, the drawings and detailed description are to be regarded as illustrative in nature and not as restrictive.

We claim:

1. A method for efficiently querying a database on a media device, the method comprising:
forming a reference cache database with reference fingerprints on the media device partitioned for multiple search levels configured for query searching, wherein each search level represents a larger portion of the reference cache database than a previous search level;
searching for media content captured on the media device using fingerprints of the captured media content in response to a local query search in each search level in progressively larger portions of the reference cache database on the media device with automatic switching between a local search on the media device and a remote search on an external search database upon not finding reference fingerprints that match fingerprints of the captured media content in any search level portion of the reference cache database; and
upon finding matching fingerprints in the remote search, downloading and storing a chunk of reference media content fingerprints, from a neighborhood of matching reference fingerprints on the external search database, in the reference cache database on the media device, whereby the reference cache database is updated with current search area reference material, wherein the external search database sends down to one of the search level portions of the media device a chunk of reference fingerprints for further local querying and media content tracking if the queries for the media content captured on the media device are found in the external search database and wherein for a second level query, a reference search range is limited to a time span around a previous successful search match, plus or minus N seconds and wherein an internal second level counter of search misses is incremented if the second level query is not found in the reference cache database.

2. The method of claim 1 further comprising:
performing the local query search on multiple subsets of a full local database on the media device with multiple counters used to schedule and control the local query search.

3. The method of claim 1 further comprising:
downloading from a remote server having the external search database the chunk of reference media content fingerprints before the local query search reaches the end of the reference cache database in a local memory on the media device.

4. The method of claim 1 further comprising:
continuously capturing the media content on the media device from media programming playing on a media presentation device; and
tracking the captured media content by using reference fingerprints associated with the continuously captured media content locally stored on the media device.

5. The method of claim 1, wherein if query fingerprints of the captured media content are not found in the reference cache database of the media device, the query fingerprints are transmitted to a remote server having the external search database for further search and content identification.

6. A method for efficiently querying a database on a media device, the method comprising:
forming a reference cache database on the media device partitioned for multiple levels of query search, wherein each search level represents a larger portion of the reference cache database than a previous search level;
querying each search level in progressively larger portions of the reference cache database on the media device with automatic switching between a local search on the media device and a remote search on an external search database upon not finding a match in any search level portion of the reference cache database; and
upon finding a match in the remote search, downloading a chunk of reference media content fingerprints from a neighborhood of matching reference fingerprints on the external search database to be stored in the reference cache database on the media device, whereby the reference cache database is updated with current search area reference material,
wherein the external search database sends down to the media device a chunk of reference fingerprints for further local querying and media content tracking if the queries are found in the external search database, and
wherein the external search database responds with a title and timing of the media content, along with related metadata, and sends these data down to the media device if the queries are found in the external search database.

7. A method for efficiently querying a database on a media device, the method comprising:
forming a reference cache database on the media device partitioned for multiple levels of query search, wherein each search level represents a larger portion of the reference cache database than a previous search level;
querying each search level in progressively larger portions of the reference cache database on the media device with automatic switching between a local search on the media device and a remote search on an external search database upon not finding a match in any search level portion of the reference cache database; and
upon finding a match in the remote search, downloading a chunk of reference media content fingerprints from a neighborhood of matching reference fingerprints on the external search database to be stored in the reference cache database on the media device, whereby the reference cache database is updated with current search area reference material,
wherein the external search database sends down to the media device a chunk of reference fingerprints for further local querying and media content tracking if the queries are found in the external search database, and
wherein query tracking a reference search range is limited to the search level portion adjacent to a previous successful search match and just slightly larger in time span than a query length.

8. A method for efficiently querying a database on a media device, the method comprising:
forming a reference cache database on the media device partitioned for multiple levels of query search, wherein each search level represents a larger portion of the reference cache database than a previous search level;
querying each search level in progressively larger portions of the reference cache database on the media device with automatic switching between a local search on the media device and a remote search on an external search database upon not finding a match in any search level portion of the reference cache database; and
upon finding a match in the remote search, downloading a chunk of reference media content fingerprints from a neighborhood of matching reference fingerprints on the external search database to be stored in the reference cache database on the media device, whereby the reference cache database is updated with current search area reference material,
wherein the external search database sends down to the media device a chunk of reference fingerprints for further local querying and media content tracking if the queries are found in the external search database, and
wherein for a second level query, the reference search range is limited to a time span around a previous successful search match, plus or minus N seconds.

9. A method for efficiently querying a database on a media device, the method comprising:
forming a reference cache database on the media device partitioned for multiple levels of query search, wherein each search level represents a larger portion of the reference cache database than a previous search level;
querying each search level in progressively larger portions of the reference cache database on the media device with automatic switching between a local search on the media device and a remote search on an external search database upon not finding a match in any search level portion of the reference cache database; and
upon finding a match in the remote search, downloading a chunk of reference media content fingerprints from a neighborhood of matching reference fingerprints on the external search database to be stored in the reference cache database on the media device, whereby the reference cache database is updated with current search area reference material, wherein the external search database sends down to the media device a chunk of reference fingerprints for further local querying and media content tracking if the queries are found in the external search database, and wherein for a third level query, a reference search range is the entire locally accessible set of fingerprints that have been downloaded to the media device.

10. The method of claim 9, wherein an internal counter of the search misses is incremented if the third level query is not found in the reference cache database.

11. The method of claim 10, wherein a count value of the internal counter is compared to a first threshold and if the count value is greater than the first threshold, then the queries are sent for a remote search on the external search database.

12. The method of claim 1, wherein the media device's reference cache database is configured to hold a chunk of audio fingerprint data and video fingerprint data corresponding to a variable length of time.

13. A method for efficiently querying a database on a media device, the method comprising:

forming a reference cache database with reference fingerprints on the media device partitioned for multiple search levels configured for query searching, wherein each search level represents a larger portion of the reference cache database than a previous search level;

searching for media content captured on the media device using fingerprints of the captured media content in response to a local query search in each search level in progressively larger portions of the reference cache database on the media device with automatic switching between a local search on the media device and a remote search on an external search database upon not finding reference fingerprints that match fingerprints of the captured media content in any search level portion of the reference cache database; and upon finding matching fingerprints in the remote search, downloading and storing a chunk of reference media content fingerprints, from a neighborhood of matching reference fingerprints on the external search database, in the reference cache database on the media device, whereby the reference cache database is updated with current search area reference material, wherein after a remote first count value of consecutive NOT FOUND results occurred in the remote search on the external search database, a next remote second count value of queries to the external search database for additional remote searches are suppressed.

14. A computer readable non-transitory medium encoded with computer readable program data and code, the program data and code when executed operable to:

form a reference cache database on the media device partitioned for multiple levels of query search, wherein each search level represents a larger portion of the reference cache database than a previous search level;

querying each search level in progressively larger portions of the reference cache database on the media device with automatic switching between a local search on the media device and a remote search on an external search database upon not finding a match in any search level portion of the reference cache database; and upon finding a match in the remote search, downloading a chunk of reference media content fingerprints from a neighborhood of matching reference fingerprints on the external search database to be stored in the reference cache database on the media device, whereby the reference cache database is updated with current search area reference material, wherein the external search database sends down to the media device a chunk of reference fingerprints for further local querying and media content tracking if the queries are found in the external search database, and wherein the external search database responds with a title and timing of the media content, along with related metadata, and sends these data down to the media device if the queries are found in the external search database.

* * * * *